United States Patent
Rockelmann

(10) Patent No.: US 8,740,294 B2
(45) Date of Patent: Jun. 3, 2014

(54) ROLLER BLIND ARRANGEMENT FOR A MOTOR VEHICLE

(75) Inventor: Andreas Rockelmann, München (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/578,979

(22) PCT Filed: Nov. 30, 2010

(86) PCT No.: PCT/EP2010/068471
§ 371 (c)(1),
(2), (4) Date: Aug. 28, 2012

(87) PCT Pub. No.: WO2011/101054
PCT Pub. Date: Aug. 25, 2011

(65) Prior Publication Data
US 2012/0312485 A1    Dec. 13, 2012

(30) Foreign Application Priority Data
Feb. 22, 2010   (DE) .......................... 10 2010 008 766

(51) Int. Cl.
*B60J 3/02*     (2006.01)

(52) U.S. Cl.
USPC ........................................................ 296/214

(58) Field of Classification Search
USPC ................ 296/214; 160/268.1, 270, 271, 272
See application file for complete search history.

(56) References Cited

U.S. PATENT DOCUMENTS

| | | | | |
|---|---|---|---|---|
| 6,874,845 B2 * | 4/2005 | Engl et al. | | 296/214 |
| 7,114,766 B2 * | 10/2006 | Becher et al. | | 296/214 |
| 7,950,440 B2 * | 5/2011 | Rockelmann et al. | | 160/273.1 |
| 2005/0257903 A1 | 11/2005 | Schimko et al. | | |
| 2006/0000566 A1 | 1/2006 | Ganser et al. | | |
| 2008/0023978 A1 * | 1/2008 | Luik | | 296/24.43 |

FOREIGN PATENT DOCUMENTS

| | | |
|---|---|---|
| DE | 102005024657 A1 | 6/2006 |
| DE | 102006034635 A1 | 1/2008 |
| DE | 102006035632 A1 | 2/2008 |
| DE | 202007016323 U1 | 4/2008 |
| DE | 102007021049 A1 | 11/2008 |
| EP | 0572709 A1 | 7/1992 |
| EP | 1690740 A1 | 11/2006 |
| EP | 1884409 A1 | 6/2007 |
| JP | 2001-107666 *  | 4/2001 |
| JP | 2004-211298 *  | 7/2004 |
| WO | 2006092227 A1 | 9/2006 |

OTHER PUBLICATIONS (International Preliminary Report dated Sep. 7, 2012 for PCT/EP2010/068471).
International Search Report (dated Jan. 25, 2011) for PCT/EP2010/068471.

* cited by examiner

*Primary Examiner* — Dennis H Pedder
(74) *Attorney, Agent, or Firm* — Fitch, Even, Tabin & Flannery LLP

(57) ABSTRACT

The invention proposes a roller blind arrangement for a motor vehicle, comprising a roller blind web by means of which a transparent portion of the motor vehicle can be at least partially shaded, and comprising at least one winding device for winding up the roller blind web. The roller blind web is formed from a knitted spacer fabric which comprises a support layer formed from a knitted fabric and a decorative layer formed from a knitted fabric and connected to the support layer via connecting threads which maintain a spacing.

4 Claims, 3 Drawing Sheets

ROLLER BLIND ARRANGEMENT FOR A MOTOR VEHICLE

CROSS-REFERENCE TO RELATED APPLICATIONS

This application is a U.S. National Stage filing under 35 U.S.C. 371 of International Application No. PCT/EP2010/068471, filed Nov. 30, 2010, designating the United States and claims the benefit of foreign priority from German Patent Application Number 10 2010 008 766.1, filed Feb. 22, 2010, the entire disclosures of which are incorporated herein by reference.

The invention relates to a roller blind arrangement for a motor vehicle according to the preamble of patent claim 1.

Such roller blind arrangements are known from practice and are used, for example, for shading a transparent portion of the roof or for side windows of a motor vehicle. It is also conceivable to use roller blind arrangements of this type as a covering for a luggage compartment or the like. Such roller blind arrangements typically comprise a roller blind web of a flexible, rollable material and a winding device, by means of which the roller blind web can be wound up to form a wound body. The winding device is, for example, formed by rolling springs, which are formed from a strip-like spring steel and are arranged at both lateral edges of the roller blind web.

In the case of roller blind arrangements known so far, the roller blind web itself consists, for example, of a knitted or woven fabric, which has a certain wind permeability, but at the same time is also light-permeable to an undesired high degree, so that the achievable degree of shading is insufficient. Use of such roller blind webs as a wind-break is only possible with a mesh width that offers a degree of shading of up to approximately 85%. However, in the case of use as a windbreak, a mesh width that offers a higher degree of shading leads to an undesired development of noise, which is referred to as humming.

It has alternatively been proposed to laminate a woven or knitted fabric with an opaque or light-impermeable film. This does allow the transparent portion to be shaded one hundred percent. However, knitted or woven fabrics with laminations that are known as blackout materials and offer a high degree of shading cannot be used as a windbreak because these materials do not allow enough air to pass through, which can likewise lead to a humming noise when the motor vehicle concerned is being driven.

The invention is based on the object of providing a roller blind arrangement comprising a roller blind web that is at least largely light-impermeable, but has a high degree of air permeability.

This object is achieved according to the invention by the roller blind arrangement with the features of patent claim 1.

The essence of the invention is consequently that the roller blind web is formed by a multi-layer knitted fabric. The multi-layer arrangement has the effect that the roller blind web allows virtually no light to pass through. However, the structure of the knitted fabric permits a good passage of air through it, so that the roller blind arrangement according to the invention can also be used as a windbreak. Therefore, a high degree of shading is achieved while at the same time sufficient air for functioning as a windbreak is allowed to pass through.

The roller blind web of the roller blind arrangement according to the invention also has cost advantages over a roller blind web laminated with a film, since knitted spacer fabrics can be produced at a lower cost than laminated materials.

The support layer may be of a standardized form, so that the same material can always be used as the support layer customer-independently, and a modular structure of the knitted spacer fabric can be realized. The material of the support layer may be set or chosen with a view to optimum sliding characteristics on lateral guides that may be present. This means that, independently of the form taken by the decorative layer, the lateral guides of the roller blind web that are expediently used in the case of a wind-break function of the roller blind arrangement always have frictional engagement with the same kind of material. The decorative layer can be designed variably in accordance with customer requirements.

In the case of an application of the roller blind arrangement as a roller blind for the roof of a motor vehicle, the decorative layer of the roller blind web formed according to the invention generally forms the underside, which forms the visible surface for occupants of the vehicle.

In the case of a preferred embodiment of the roller blind arrangement according to the invention, the roller blind web is respectively guided in its edge regions at the sides with respect to a pulling-out direction in a guideway that is fixed to the body of the vehicle, the roller blind web being free from the decorative layer in these edge regions. There are consequently regions of different thickness on the roller blind web, which in turn leads to a smaller diameter in the area of the edge regions of the wound body that results from winding up of the roller blind web, and therefore leads to an optimized space requirement. This is advantageous in particular in the case of roller blind arrangements without a winding shaft.

In the case of an expedient embodiment of the roller blind arrangement according to the invention, the roller blind web respectively has in its edge regions at the sides with respect to a pulling-out direction a guiding strip, which is guided in a guideway that is fixed to the body of the vehicle and is preferably a winding spring.

In the region of the decorative layer, the roller blind web has, for example, a material thickness of 0.8 mm to 1.3 mm, whereas in regions that are free from the decorative layer, which are present in particular in the region of the lateral guides, the roller blind web has, for example, a material thickness of 0.2 mm to 0.5 mm.

Further advantages and advantageous refinements of the subject matter of the invention can be taken from the description, the drawing and the patent claims.

An exemplary embodiment of a roller blind arrangement according to the invention is described in more detail in the description which follows and is represented in a schematically simplified form in the drawing, in which.

Figure 1:
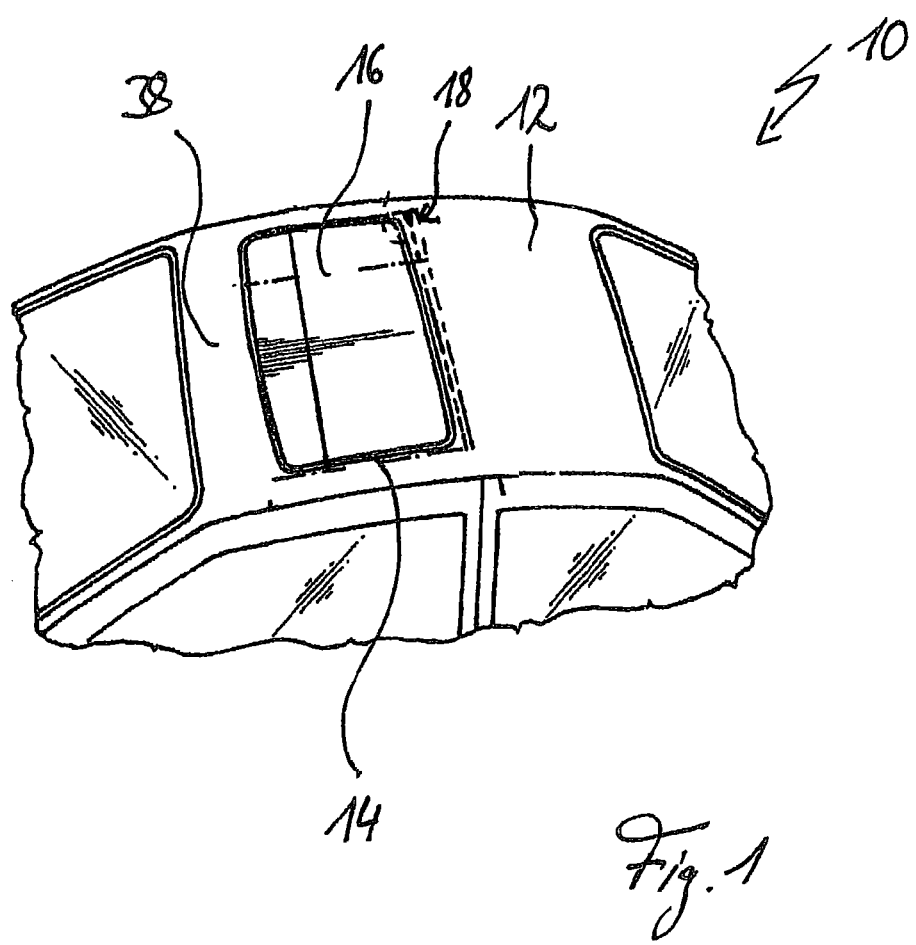
FIG. 1 shows a schematic plan view of a roof of a motor vehicle with a roller blind arrangement.

In FIG. 1 there is shown a motor vehicle 10 with a vehicle roof 12, which is provided with a roof cutout 14, which by means of a transparent cover element 16 can be optionally closed or at least partially exposed.

Figure 2:
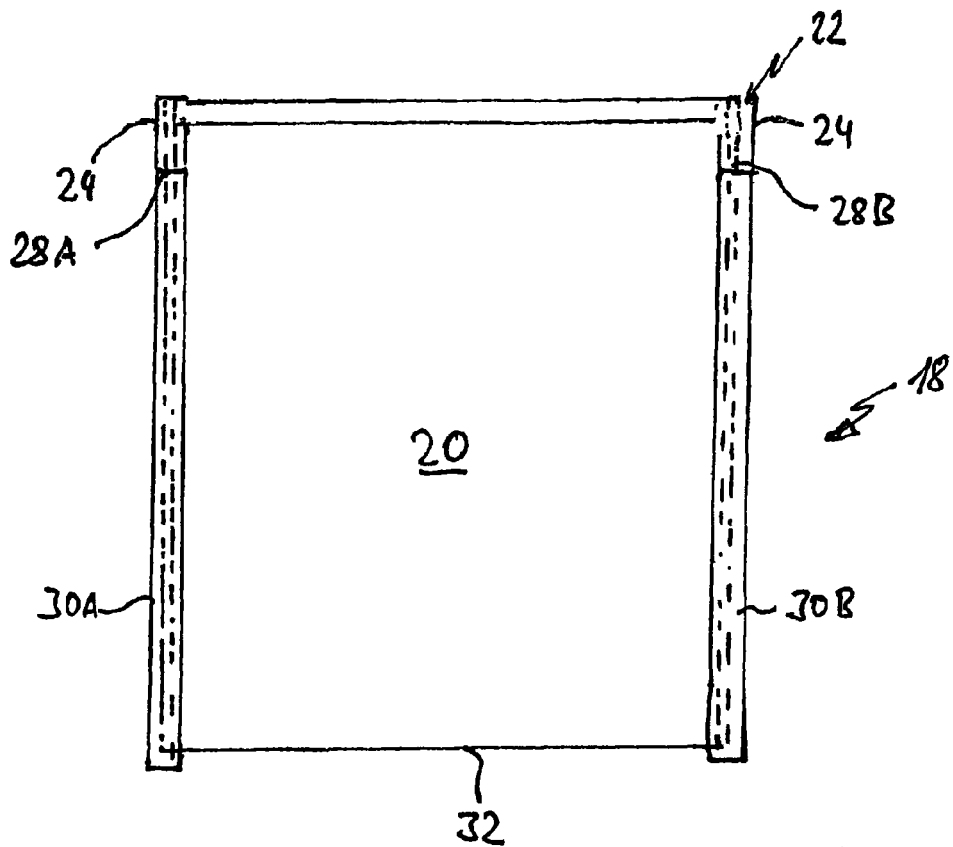
FIG. 2 shows the roller blind arrangement on its own.
Figure 3:
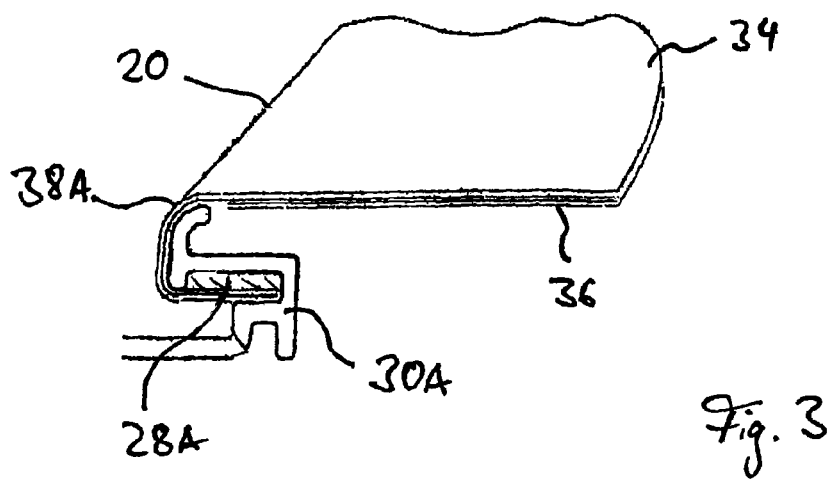
FIG. 3 shows the roller blind arrangement in a guiding region.
Figure 4:
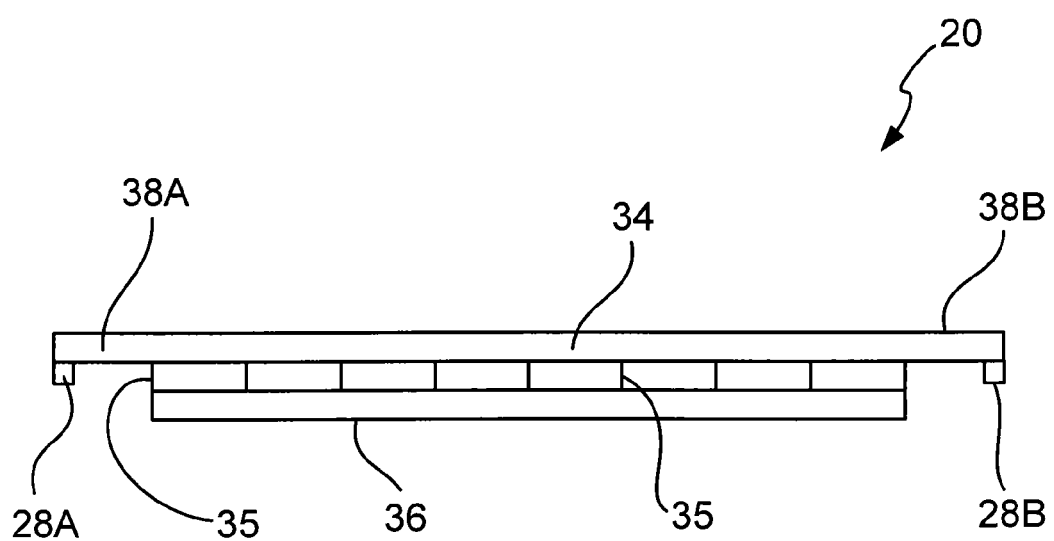
FIG. 4 shows a section through a roller blind web of the roller blind arrangement.

For shading the roof cutout 14, the vehicle roof 12 comprises a roller blind arrangement 18, which in FIG. 2 is shown on its own. As the shading element, the roller blind arrangement 18 comprises a roller blind web 20, which is formed by a flexible, rollable knitted spacer fabric and can be wound up on and unwound from a winding device 22.

The winding device 22 comprises guides or bearings 24, which are arranged on both sides of the roller blind web 20, are formed mirror-symmetrically, are fixedly connected to the vehicle and have a guiding plate on their free end face. The roller blind arrangement 18 therefore does not have a separate winding shaft. Rather, when opening, that is to say exposing the roof cutout 14, the roller blind web 20 is wound up directly on the guides or bearings 24.

At its edge regions 38A and 38B, extending along the pulling-out direction, the roller blind web 20 has guiding strips 28A and 28B, which are respectively formed by a metal strip which forms a rolling spring and is respectively guided in a guiding channel of a guiding rail 30A and 30B extending in the longitudinal direction of the vehicle, the edge regions 38A and 38B respectively being wrapped around in a substantially C-shaped form. The guiding strips 28A and 28B have such a spring pretension that they wind up of their own accord outside of the respective guiding rail 30A or 30B, that is to say in the region of the winding device 22 that is formed by the guides or bearings 24, and thus bring about a winding up of the roller blind web in the guides or bearings 24 when the roller blind web 20 is pulled back. When the roller blind web 20 is being wound up in the guides or bearings 24 arranged on both sides, the guiding strips 28A and 28B are respectively guided in a slideway. This achieves the effect that the roller blind web 20 in the wound-up state, that is to say in the region of its wound body, remains tensioned in the transverse direction of the vehicle. The slideway forms a continuation of the lateral guide formed by the respective guiding rail 30A or 30B.

Instead of rolling springs, also conceivable as an alternative are metal strips that have no spring function and, rather, are driven by a spring drive, which is arranged for example in a winding shaft, or by driving springs, which are integrated in the guides or bearings.

On the side facing away from the wound body, the roller blind web 20 is also provided with a draw bar 32, which with its ends is likewise guided in the guiding rails 30A and 30B and by means of which the roller blind web can be actuated.

As already mentioned above, the roller blind web 20 is formed by a knitted spacer fabric. The knitted spacer fabric comprises a support layer 34, which is formed by a first knitted fabric, extends over the entire width of the roller blind web 20 in the transverse direction of the vehicle and to which the guiding strips 28A and 28B are fixed. Apart from the support layer 34, the roller blind web 20 comprises a decorative layer 36, which faces the passenger compartment of the vehicle, is likewise formed by a knitted fabric and is connected to the support layer 34 by means of a space-maintaining connecting structure, which is formed by connecting threads 35 that are also referred to as pile threads. The decorative layer 36, which forms the visible surface of the roller blind arrangement 18, respectively extends in the transverse direction of the vehicle only up to the guiding rail 30A or 30B; that is to say that the edge regions 38A and 38B, which run within the guiding rails 30A and 30B, are free from the decorative layer 36.

In the region of the decorative layer 36, the roller blind web 20 has a material thickness of, for example, approximately 1.3 mm. By contrast, in the edge regions 38A and 38B that are free from the decorative layer, the roller blind web 20 has only a material thickness of, for example, approximately 0.5 mm.

Forming the roller blind web 20 as a knitted spacer fabric allows a high degree of shading to be achieved by means of the roller blind arrangement 18, which may be up to approximately 99%. At the same time, the knitted spacer fabric permits a good passage of air through it, so that, even with the cover element 16 open, the roller blind arrangement 18 can be used as what is known as a windbreak.

List of Designations

10 Motor vehicle
12 Vehicle roof
14 Roof cutout
16 Cover element
18 Roller blind arrangement
20 Roller blind web
22 Winding device
24 Guides/bearings
28A,B Guiding strips
30A,B Guiding rails
32 Draw bar
34 Support layer
36 Decorative layer
38A,B Edge regions

The invention claimed is:

1. A roller blind arrangement for a motor vehicle, comprising
a roller blind web, by means of which a transparent portion of the motor vehicle can be at least partially shaded, and at least one winding device for winding up the roller blind web,
the roller blind web having a width and being formed by a knitted spacer fabric, which comprises a support layer, which is formed by a knitted fabric and extends over the entire width of the roller blind web, and a decorative layer, which is formed by a knitted fabric and is connected to the support layer by means of space-maintaining connecting threads on an interior side of the support layer,
wherein the roller blind web is respectively guided in its edge regions at the sides with respect to a pulling-out direction in a guideway having an opening, an outer surface and an interior surface defining a guideway interior that is fixed to the body of the vehicle, and in these edge regions comprises a single layer and is free from the decorative layer;
wherein the roller blind web respectively has in its edge regions at the sides with respect to a pulling-out direction a guiding strip, which contacts an upper interior surface of the guideway that is fixed to the body of the vehicle, the guiding strip being fixed to the interior side of the support layer of the roller blind web; and
wherein a portion of the roller blind web is in direct contact with both a portion of the guideway outer surface and a portion of a lower interior surface of the guideway and wherein the roller blind web extends into the guideway interior through the guideway opening.

2. The roller blind arrangement as claimed in claim 1, wherein the guiding strip is a rolling spring for winding up the roller blind web on the winding device.

3. The roller blind arrangement as claimed in claim 1, wherein the roller blind web has in the region of the decorative layer a thickness of 0.8 mm to 1.3 mm and in regions that are free from the decorative layer a thickness of 0.2 to 0.5 mm.

4. The roller blind arrangement as claimed in claim 1, wherein the roller blind arrangement serves for shading a transparent portion of the roof of the motor vehicle.

* * * * *